M. B. BECKER.
ASPHALTIC SHINGLE.
APPLICATION FILED MAR. 8, 1916.
1,256,508.
Patented Feb. 19, 1918.
3 SHEETS—SHEET 1.
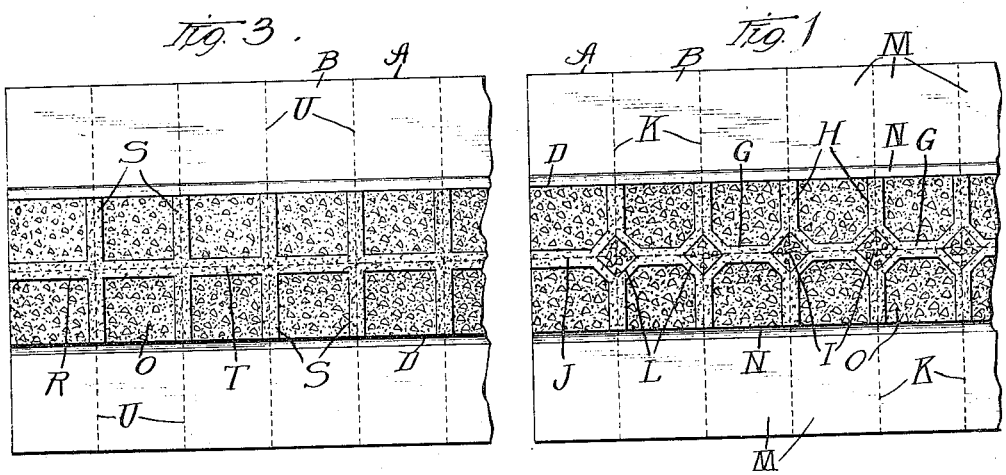
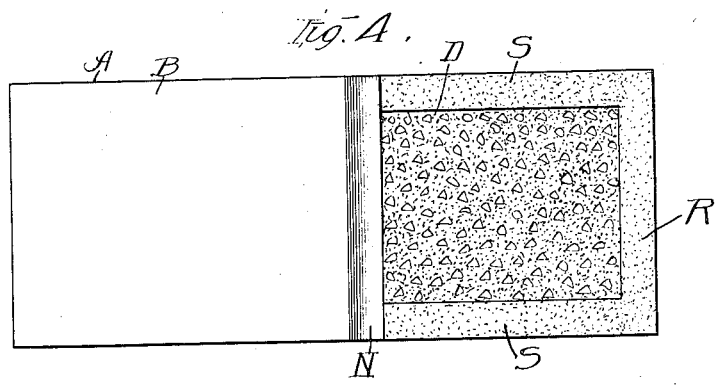
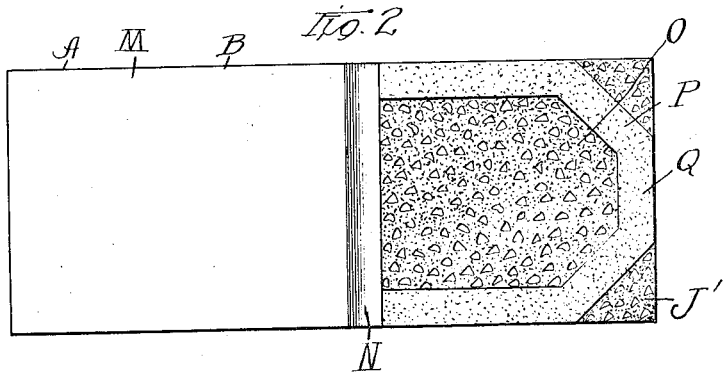
Witnesses
W. P. Kilroy
Harry Fred White
Inventor
Mathias B. Becker
By Rudolph Wm. Lotz, Atty.

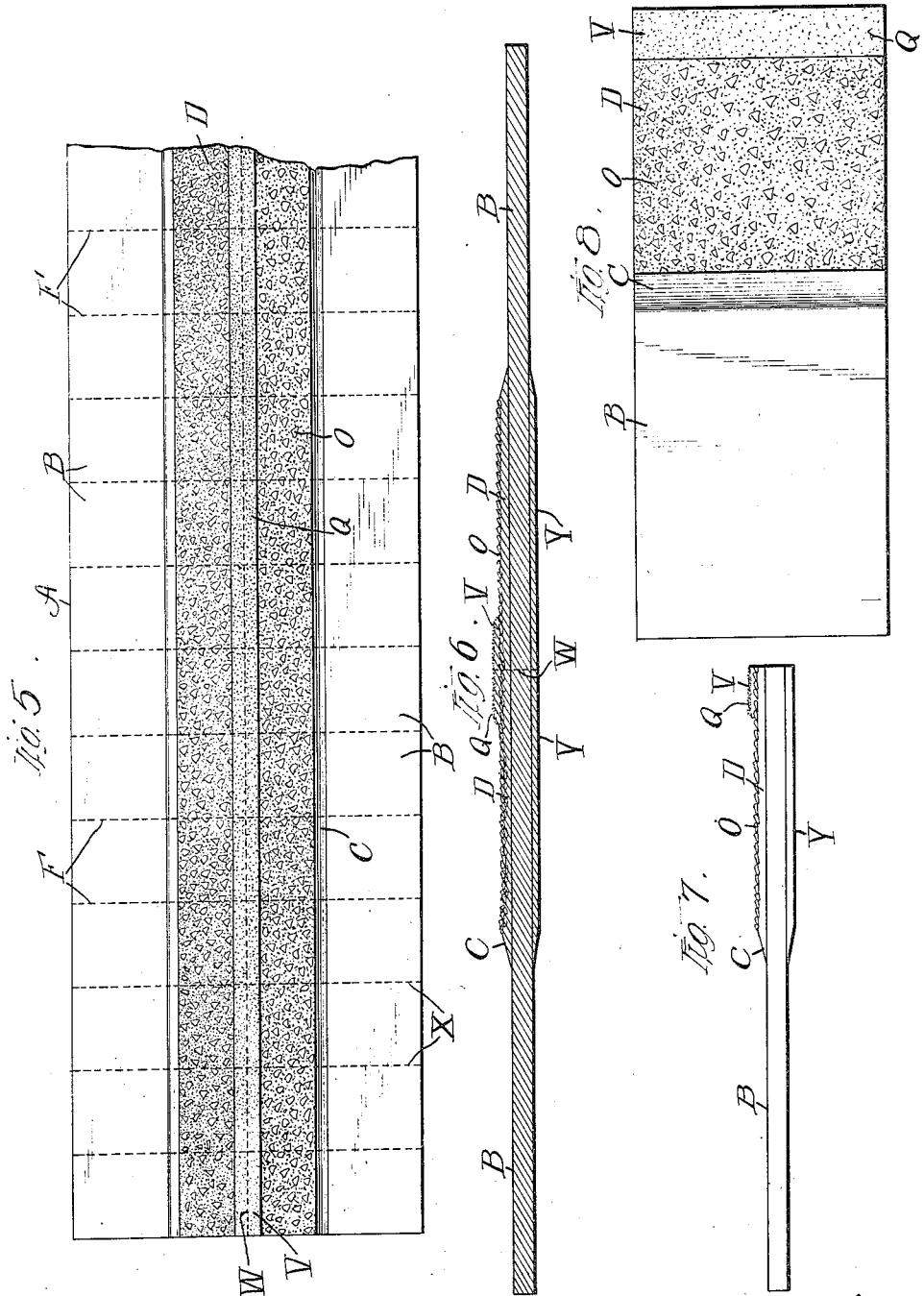

M. B. BECKER.
ASPHALTIC SHINGLE.
APPLICATION FILED MAR. 8, 1916.
1,256,508.
Patented Feb. 19, 1918.
3 SHEETS—SHEET 3.
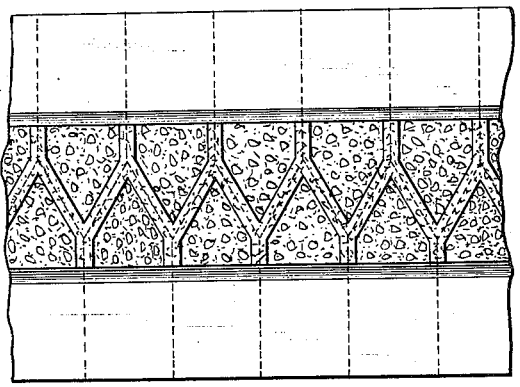
Fig. 9.
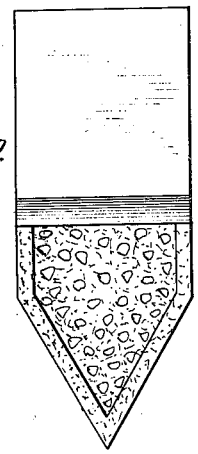
Fig. 10.
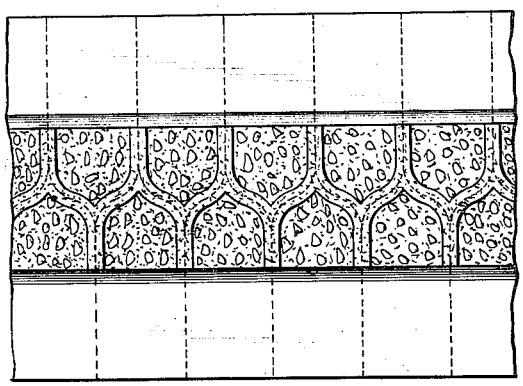
Fig. 11.
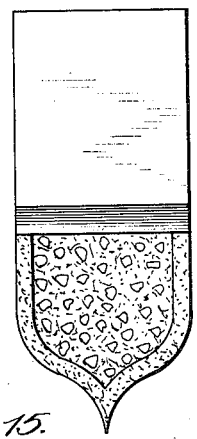
Fig. 12.
Fig. 13.
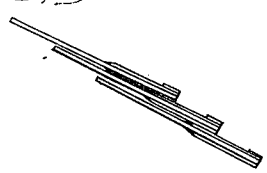
Fig. 14.
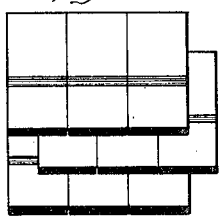
Fig. 15.
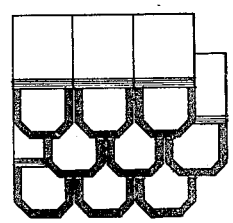
Fig. 16.
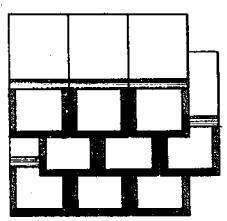
Fig. 17.
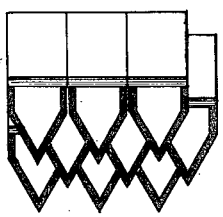
Fig. 18.
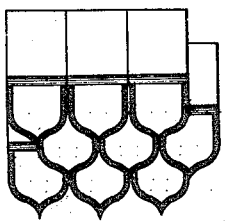
Witness
W. F. Kilroy
Inventor
Mathias B. Becker
By Rudolph Jr. Att'y

UNITED STATES PATENT OFFICE.

MATHIAS B. BECKER, OF CHICAGO, ILLINOIS.

ASPHALTIC SHINGLE.

1,256,508.

Specification of Letters Patent.  Patented Feb. 19, 1918.

Application filed March 8, 1916.  Serial No. 82,822.

*To all whom it may concern:*

Be it known that I, MATHIAS B. BECKER, citizen of the United States, residing at Chicago, in the county of Cook and State of Illinois, have invented certain new and useful Improvements in Asphaltic Shingles; and I do hereby declare the following to be a full, clear, and exact description of the invention, such as will enable others skilled in the art to which it appertains to make and use the same.

This invention has for its object to provide improved shingles for roofing buildings, and relates particularly to so-called "composition" or "asphalt" shingles which generally are composed of a paper base impregnated with an asphaltic water-proofing composition and coated with an asphaltum or other bituminous material, such as coal tar, and are faced with a comminuted mineral such as crushed slate, crushed china or porcelain, tile or natural stone of various kinds, the purpose of which is two-fold, namely: to protect the exposed portion or weather-face of the shingle against the action of the elements, and also to impart a substantially uniform bright color to the shingles.

The paper base of these shingles is, however, relatively thin, and the thickness thereof is not very materially increased by the bituminous coating and comminuted mineral facing, which latter becomes partially embedded in said asphaltum coating and is held in place thereby. Roofs covered with shingles are rendered attractive by reason of the contrasting color effects produced by shadows created by the sun shining on the roof, and by the fact that the surface of the roof is not smooth. The shingles thus give a configuration to the roof which is preferable to the monotony of a smooth surfacing such as is produced for example by flexible sheet roofing of plain color.

The thinness of the composite asphaltic shingles is not sufficient to produce that ruggedness or such decided shadow lines thereon as will render the roof as attractive as would be the case were said shingles thicker at their lower or exposed edges which naturally increased the depth of the shadows produced by the sun shining on the roofs. The tapered wood shingles are relatively thick at their exposed edges, and, when viewing the roof from a distance, these edges present lines of considerable depth, even though the sun is not shining, and this lends to the attractiveness of the roof. A tile roof is more attractive than a shingle roof by reason of the even higher elevations of the raised portions of the tiles than the edges of wood shingles. The asphaltic shingles are, of course, also apt to lose the comminuted mineral facing by the washing action of rain and the friction of snow and ice passing down over the roof, and obviously those particles nearest the lower edges of the shingles are most apt to be first removed.

The object of the present invention is, therefore, to provide roofing shingles in which the comminuted mineral facing along the exposed lower edge, in particular, as well as along the side edges, are completely embedded in an asphaltic material or compound which thus prevents the removal thereof, and forms ridges over which rain, snow and ice will wash and rub without removing said comminuted mineral particles therefrom, thus increasing the life of the shingles. Furthermore, this strip or stripe of asphaltum so covering and embedding the comminuted mineral facing along the edges of the shingle also has the effect of giving the shingle the appearance of being very much thicker than it is, and obviously also reinforces and stiffens the shingle so that it is not so easily affected by high winds which are apt to cause a flapping of these relatively thin and light shingles on the roof. The reinforcing action of these strips is particularly emphasized when the same extend along the longitudinal edges of the shingles as well as along the lower edges thereof, the longitudinal edge-stripes coacting with the lower edge-stripes to greatly enhance the ornamental appearance of the roofs covered thereby.

In a copending application filed July 13, 1914, Ser. No. 850,672, I have illustrated and described a method of producing a roofing material or shingle stock, and the present invention relates to improvements in the production of such shingle stock and of shingles produced therefrom.

In the accompanying drawings illustrating the preferred embodiment of the present invention:

Figure —1— is a top plan view of a strip of shingle stock made in accordance with the invention to produce the shingles illustrated in Fig. —2—.

Fig. —2— is a view in elevation of the weather-face of a shingle produced from the shingle stock illustrated in Fig. —1—.

Fig. —3— is a view similar to Fig. —1— of shingle stock made in accordance with the invention for producing the shingle shown in Fig. —4—.

Fig. —4— is a view in elevation of the weather-face of a shingle produced from the stock illustrated in Fig. —3—.

Fig. —5— is a view similar to Fig. —1— showing shingle stock adapted to produce shingles such as are shown in Fig. —8—.

Fig. —6— is a transverse section of the shingle stock shown in Fig. —5—.

Fig. —7— is a side elevation of the shingle shown in Fig. —8—.

Fig. —8— is a view in elevation of the weather-face of a shingle produced from the stock shown in Figs. —5— and —6—.

Fig. —9— is a view similar to Fig. —1— showing the shingle stock bearing a symmetrical design for producing shingles such as shown in Fig. —10—.

Fig. —10— is a view of the weather-face of a shingle produced from the stock of Fig. —9—.

Fig. —11— is a view similar to Fig. —1—, showing the shingle stock provided with a symmetrical design for producing shingles, as shown in Fig. —12—.

Fig. —12— is a face view of a shingle cut from the stock of Fig. —11—.

Fig. —13— is a fragmentary detail transverse section showing shingles of the type illustrated in Figs. —6—, —7— and —8— disposed in proper overlapped relation in a roof.

Figs. —14— to —18— inclusive are fragmentary detail views in elevation showing roofs composed of shingles of various designs illustrated and constructed in accordance with the invention.

The present invention relates more particularly to the treatment of shingle stock to produce shingles embodying the essence of the present invention. The shingle stock illustrated in Fig. —1— consists of a web or strip of a suitable base-material such for example as so-called wool-felt paper, or similar porous, fibrous material which lends itself readily to impregnation with fluid water-proofing compound, and will retain facings or coatings of bituminous material, preferably asphaltum. This sheet or web is boiled, or otherwise treated, with asphaltum or an asphaltic compound in a molten state, whereby said sheet becomes impregnated therewith to render the body thereof waterproof. I prefer to boil this sheet or web A in asphaltum at a very high temperature whereby such asphaltum is rendered extremely fluent so that it will enter and fill the pores of said web. The nature of asphaltum used is preferably such as will become fairly hard and rigid when cold, so as to lend considerable stiffness and rigidity to the web impregnated therewith.

As this web or base material A leaves the asphaltum vats it carries with it coatings of the asphaltic material on both faces thereof. This coating is preferably wiped off along the edge portions B of the strip or web, thus leaving only a wide stripe of the same midway between the side edges of the strip or web A, said stripe being indicated at C in Fig. —6—. While this stripe or band, as it may be termed, of asphaltic material is still very soft, comminuted mineral such as crushed slate, or other natural rock, or crushed vitreous clay products, is projected thereon, said comminuted mineral being preferably of a uniform color, and becoming partially embedded in said soft asphaltic coating to which the same adheres very firmly, thus becoming fixed to said stripe C, and producing a central stripe D on the web A which is of the uniform color of the said comminuted mineral. The shingle stock thus formed is adapted to be cut midway between the side edges of the sheet or web A and midway between the side edges of the stripe D to divide the strip longitudinally into two equal parts, and this when cut transversely along the dotted lines F will form shingles each of which carries the comminuted mineral facing D, on one end portion of its weather-face which is adapted to overlap the other portion of a lower row of shingles which are devoid of said mineral facing. The shingle thus becomes somewhat tapered, that is, of greater thickness along its weather exposed portion than its overlapped portion of the roof.

The foregoing is fully disclosed in my aforesaid copending application, the present improvement residing in the following:

After the said comminuted mineral facing D is applied to the strip or web A over the stripe or band of asphaltic material C, the said strip is passed over a suitable printing roll, such as is disclosed in my copending application for Letters Patent for machine for printing roofing Ser. No. 803,131, filed Nov. 26, 1913, and this printing roll is equipped with raised projections for applying over the comminuted mineral facing D, a symmetrical design in lines, stripes and areas, a suitable asphaltic material in fluid state being used to produce the same. Said design preferably comprises a longitudinal line or stripe G, and transverse lines or stripes of said material, as H, and at the intersections of said longitudinal and transverse stripes G and H respectively, includes what might be termed diagonally disposed circumscribed squares or rectangles I. The said material may consist of the compound set forth in Letters Patent No. 1,024,549 and 1,024,550, granted to me on April 30, 1912, or may consist of pure asphaltum applied in the manner set forth in Letters Patent No. 1,174,960, granted to me on the 14th day of March, 1916, it being essential to the successful manufacture of these shingles, and to insure their life and durability, that the asphaltic compound, or asphaltum applied over the mineral coating shall cover and embed and penetrate through said mineral coating and become amalgamated or otherwise firmly combined with the coating C. If the compound of the aforesaid Letters Patent of April 30, 1912, is applied it will be necessary also to apply over the lines and stripes and areas G, H, and I, a fine sand or similar material as and for the purpose set forth in Letters Patent No. 1,157,664 and 1,157,665, granted to me October 26, 1915.

The lines, stripes and areas G, H and I will thus be of a color contrasting with the color of the comminuted mineral facing D, and will be of the same color as the exposed edges of the shingles when cut from the now prepared stock illustrated in Fig. —1—.

The latter is now cut longitudinally along the dotted line J, and along the transverse dotted lines K, thus producing from the stock of Fig. —1— the shingles illustrated in Fig. —2—, bearing the design of what is known technically as "cut shingles". Each of said shingles comprises an underlapped portion M devoid of comminuted mineral facing, and having only what may be termed a very minute film coating of asphaltum, the other end portion of the weather-face carrying the thicker asphaltum coating N corresponding to the coating C of the strip A, and carrying the comminuted mineral facing O corresponding to the mineral facing D of said strip A. The outer edges of the comminuted mineral-faced portion of said shingle will be provided with a border P of asphaltic material, completely embedding the comminuted mineral particles O along said edge portions, and carrying, in some instances, a second facing Q of fine sand, or similar crushed mineral material of about the degree of fineness of sand, it being preferable to employ for this purpose a facing Q which will absorb some of the asphaltum and will thus be blackened thereby so as to maintain said edge portions P as black as the asphaltic body and exposed edge portions of the shingle. The triangular corner portions J' of these shingles may be cut away, but it is preferable to retain the same as this effects economy in the number of shingles required to cover a roof as will be obvious to persons skilled in this art.

Obviously the width of the border P or lines forming the design on the shingle may be varied, as desired, though in the drawings I have shown the same relatively wide merely for purposes of illustration.

As shown in the sectional view of Fig. —6— and side elevation of Fig. —7—, the said border Q projects somewhat above the comminuted mineral facing O so that the shingles become thicker at their exposed edge-portions than in the body of the comminuted mineral-faced portions, and obviously very much thicker than the portions M of said shingles.

The said shingle stock may also be made, as illustrated in Fig. —3—, in which the longitudinal and transverse lines R and S respectively, are applied by means of the printing rolls, the areas I being omitted. The stock of Fig. —3— is adapted to be cut along the longitudinal and transverse dotted lines T and U respectively, to produce the shingles illustrated in Fig. —4—, having merely rectangular areas carrying the comminuted mineral facing and asphaltic border to be exposed to view on the roof.

The stock may also be made, as shown in Figs. —5— and —6—, in which only a longitudinal stripe V of asphaltic compound or material is applied so that when this stock is cut along the longitudinal and transverse dotted lines, W and X respectively, shingles will be produced such as are shown in Figs. —7— and —8—.

It will be obvious that the shingle stock may bear various symmetrical designs other than those illustrated in Figs. —1—, —3— and —5—, as exemplified in Figs. —9— and —11— from which shingles such as shown in Figs. —10— and —12— respectively may be cut by cutting the stock along the dotted lines following the contour of the symmetrical design midway between the side edges of the lines or stripes constituting the same. It will be further noted that in the design shown in Figs. —9— and —11— shingles of relatively fanciful shapes are produced without occasioning any waste of stock, such as is occasioned in cutting the shingle stock illustrated in Fig. 1.

Shingles constructed in accordance with the invention as hereinbefore fully described will produce roofs of very handsome appearance as illustrated in Figs. —14— to —18— inclusive.

It will be noted that in Fig. —6— I have shown a rather heavy asphaltic coating Y applied to the under face of the web A midway between the side edge thereof, this additional asphaltic coating serving to further thicken the weather-exposed portions of the shingles, as shown in Fig. —7—, and adding strength and stiffness thereto, as will be obvious.

I claim as my invention:

1. As a new article of manufacture, a shingle comprising a base of substantially uniform thickness, a surfacing of a granular mineral matter covering and increasing the thickness of the weather-face only of said shingle, and a coating of a weatherproof compound along an edge of the weather-face of the shingle covering and further increasing the thickness of said weather-face along said edge.

2. As a new article of manufacture, a shingle comprising a base of substantially uniform thickness, a surfacing of comminuted mineral of substantially uniform thickness through its extent secured upon one end portion of said base and constituting the weather-face of the shingle, said surfacing increasing the thickness of the weather-face portion over the over-lapped portion of the shingle, and a layer of a weather-proof compound disposed along the lower edge-portion of the weather-face of the shingle and projecting above the level of the mineral surfacing thereof.

3. As a new article of manufacture, a shingle comprising a base of substantially uniform thickness impregnated with an asphaltic compound, a coating of such compound on the weather-face portion only of said shingle, a surfacing of comminuted mineral partially embedded in said coating, and increasing the thickness of said portion of said shingle, and a layer of asphaltic compound disposed over the comminuted mineral facing along an edge of the shingle, said compound serving to further increase the thickness of said shingle along said edge.

4. As a new article of manufacture, a shingle comprising a base of substantially uniform thickness impregnated with an asphaltic compound, a coating of such compound on the weather-face portion only of said shingle, a surfacing of comminuted mineral partially embedded in said coating imparting color to the same and increasing the thickness of said portion of said shingle, and a layer of asphaltic compound disposed over the comminuted mineral facing along an edge of the shingle, said compound serving to further increase the thickness of said shingle along said edge and being of a color contrasting with that of said mineral surfacing.

5. As a new article of manufacture, a shingle comprising a base of substantially uniform thickness impregnated with an asphaltic compound, a coating of such compound on both faces of the weather-face portion of said shingle, a surfacing of comminuted mineral partially embedded in said coating on one of said faces, said coatings and surfacing increasing the thickness of said portion of said shingle, and a layer of asphaltic compound disposed over the comminuted mineral facing along an edge of the shingle, said compound serving to further increase the thickness of said shingle along said edge.

In testimony whereof I have signed my name in presence of two subscribing witnesses.

MATHIAS B. BECKER.

Witnesses:
M. M. BOYLE,
G. M. WALKER, Jr.